UNITED STATES PATENT OFFICE.

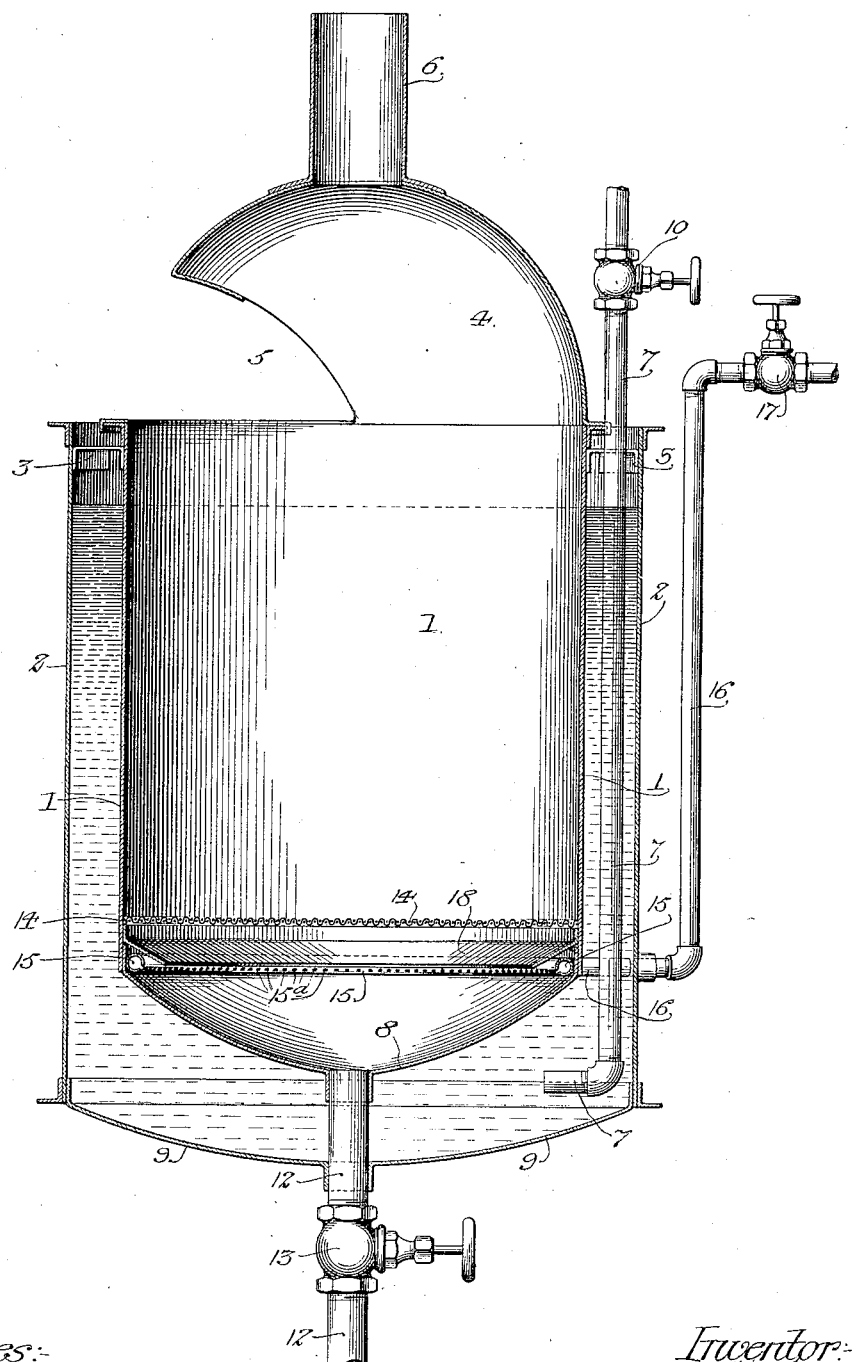

ROBERT ROOS, OF CHICAGO, ILLINOIS.

APPARATUS FOR TREATING BUTTER.

1,060,633.

Specification of Letters Patent. Patented May 6, 1913.

Application filed February 24, 1913. Serial No. 750,381.

*To all whom it may concern:*

Be it known that I, ROBERT ROOS, a citizen of the United States, and a resident of the city of Chicago, county of Cook, and State of Illinois, have invented certain new and useful Improvements in Apparatus for Treating Butter, of which I do declare the following to be a full, clear, and exact description, reference being had to the accompanying drawing, forming part of this specification.

The present invention, while susceptible of other uses, is more especially designed to provide an improved apparatus for the melting of what is commonly known as "process butter"—that is to say, butter that is subjected to the action of steam for freshening and removing impurities therefrom.

The invention consists in the features of novelty hereinafter described, illustrated in the accompanying drawing and particularly pointed out in the claims at the end of this specification.

Referring to the accompanying drawing, 1 designates a vat or kettle that is surrounded by a larger vessel 2, the space between the kettle 1 and the outer vessel 2 serving as a receptacle for water by which heat will be applied to the vat or kettle 1. Suitable angle bars or struts 3 serve to maintain the vat or kettle 1 in proper relation to the outer vessel 2. Over the vat or kettle 1 is placed a hood 4, a portion of which is open, as at 5, to permit the butter to be placed within the vat or kettle 1, and from the top of the hood 4 leads a pipe 6 for the escape of vapors, etc.

Within the space between the vat or kettle 1 and the outer vessel 2 extends a steam supply pipe 7, the discharge end of which terminates, preferably, between the inclined bottom 8 and the vat or kettle 1 and the bottom 9 of the outer vessel 2, and this pipe 7 is provided with a suitable valve 10 whereby the flow of steam through the pipe 7 may be regulated. A pipe 12 connected to a central opening of the inclined bottom 8 of the vat or kettle 1 leads through an opening in the bottom 9 of the outer vessel 2 for the withdrawal of the melted butter or the like, and this pipe 12 is furnished with a suitable valve 13 whereby the discharge from the vat or kettle 1 may be controlled.

The vat or kettle 1 is provided at some distance above its inclined bottom 8 with a reticulated false bottom 14 of wire mesh, perforated metal or the like, and between this false bottom 14 and the inclined bottom 8 is arranged a perforated, annular pipe 15 to which steam will be admitted from a pipe 16 leading from a suitable source of steam supply, the pipe 16 being provided with a suitable valve 17 whereby the supply of steam may be regulated. The perforations $15^a$ in the annular steam pipe 15 may be of any desired number and arrangement, although it is preferred that these perforations should be located substantially as indicated in the drawing, for the most effective admission of the steam. Above the annular steam pipe 15 and below the false bottom 14 is placed an annular shield or baffle-plate 18 that is secured to the body of the vat or kettle 1 and extends inwardly and downwardly to a slight distance beyond the annular steam pipe 15. As shown, this shield or baffle 18 is arranged at a slight distance above the annular steam pipe 15, so as not to be overheated thereby.

In the use of my improved apparatus, the butter to be treated will be placed upon the reticulated false bottom 14 and, the space between the vat or kettle 1 and the outer vessel 2 having been approximately filled with water, steam will be admitted by the pipe 7 to heat the water and the material within the vat or kettle 1. Live steam will be admitted to the annular steam pipe 15 through the pipe 16 that passes through the walls of the outer vessel 2 and the vat or kettle 1, and the steam thus supplied will pass in minute streams from the perforations $15^a$ around the shield or baffle 18 and up through the butter upon the false bottom 14 and, as the butter is melted and flows through the reticulated false bottom 14, all particles of it will be exposed to the finely divided currents of steam. The shield or baffle 18 will effectively serve to prevent the contact of the butter with the steam pipe 15, and this is a very important feature, since it guards against all danger of the butter being burned by contact with the pipe 15.

During the operation of the apparatus, the valve 13 is open, so that the melted butter falling from the perforated false bottom 14 and inclined shield 18 onto the inclined bottom 8, will pass off through the pipe 12 into a vat placed below the pipe. By means of the valve 17 the amount of steam delivered through the perforations of the annular steam pipe 15 can be accurately regulated;

while by means of the valve 10 the amount of steam admitted to the water jacket can be controlled so as to give to the volume of water the desired temperature.

It will be apparent that the vapors arising from the treatment of the butter within the vat or kettle 1 will be collected within the hood 4 and pass thence through the discharge pipe 6.

Having thus described my invention, what I claim as new, and desire to secure by Letters Patent, is:—

1. An apparatus of the character described, comprising a heating jacket, a melting vat or kettle arranged within said jacket, a reticulated bottom for said vat or kettle, a perforated steam supply pipe arranged within said vat or kettle beneath said reticulated bottom, a pipe for admission of steam to said steam supply pipe, a shield interposed between said steam supply pipe and said reticulated bottom and a discharge pipe leading from the bottom of the vat or kettle.

2. An apparatus of the character described, comprising a heating jacket, a melting vat or kettle arranged within said jacket, a reticulated bottom for said vat or kettle, an annular, perforated steam supply pipe arranged within said vat or kettle adjacent the wall thereof and beneath said reticulated bottom, a pipe for admission of steam to said steam supply pipe, an annular, downwardly inclined shield interposed between said steam supply pipe and said reticulated bottom and a discharge pipe leading from the bottom of the vat or kettle.

ROBERT ROOS.

Witnesses:
LOUIS M. F. WHITEHEAD,
KATHARINE GERLACH.

Copies of this patent may be obtained for five cents each, by addressing the "Commissioner of Patents, Washington, D. C."